Aug. 6, 1940.　　K. O. HOLMSTRÖM　　2,210,409
SLED FOR SNOW CHARGES
Filed March 25, 1939
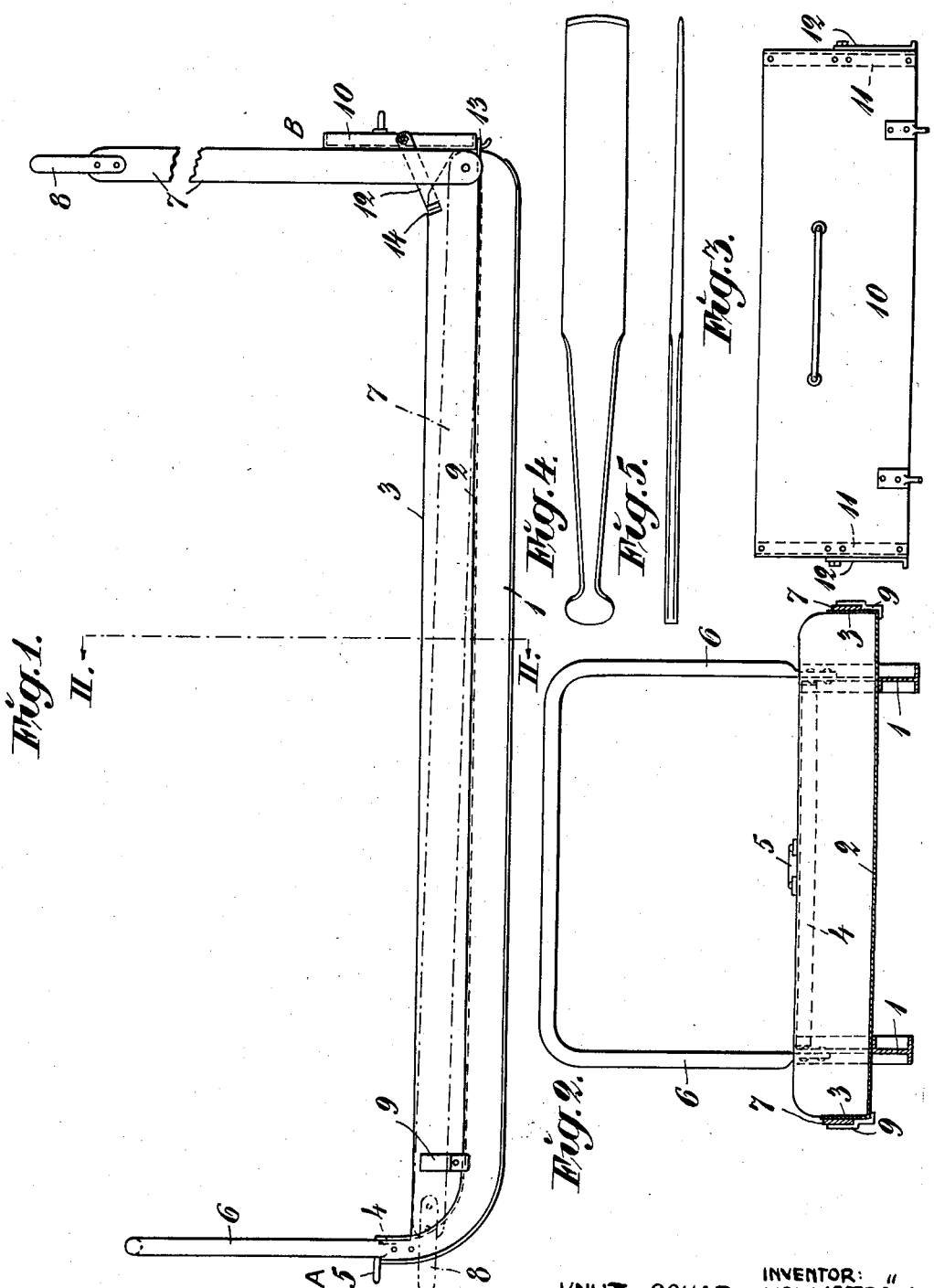
INVENTOR:
KNUT OSKAR HOLMSTRÖM
by: Haseltine, Lake & Co.
ATTORNEYS Patented Aug. 6, 1940

2,210,409

UNITED STATES PATENT OFFICE 2,210,409

SLED FOR SNOW CHARGES

Knut Oskar Holmström, Lulsundet, Lulea, Sweden

Application March 25, 1939, Serial No. 264,111
In Sweden April 1, 1938

1 Claim. (Cl. 37—53)

The present invention relates to a sled for snow charges intended to be loaded by forcing the sled into a mass of snow, and the feature substantially distinguishing the invention consists in that knives adapted to be swung vertically in the longitudinal direction of the sled to sever the mass of snow loaded on the sled are mounted at both sides of the sled. At the rear end, the charge of snow may be severed in a vertical direction by means of snow spades or levers which may also be used to facilitate the starting of the sled under load.

According to an embodiment of the invention, a removable door is arranged at the rear end of the sled, said door being removed when the sled is forced into the snow, and being then applied again to prevent the sliding of the snow off the sled in transport.

An embodiment of the invention is illustrated by way of example in the accompanying drawing.

Fig. 1 shows the sled in elevation.
Fig. 2 is a cross section on line II—II in Fig. 1.
Fig. 3 is a plan view of a detail.
Figs. 4 and 5 are two views of a tool which is serviceable in connection with the sled.

I designates the two runners of the sled which, as illustrated, may preferably be formed by welding a T-iron and an L-iron together. Secured to the runners is the charge platform 2 of the sled, said platform consisting preferably of sheet iron which is bent upwardly at the sides 3 to retain the charge in a lateral direction. At the fore end A of the sled, the runners are bent upwardly, their upper ends being connected by means of a brace 4 consisting, for instance, of an angle iron which at the same time reinforces the front edge of the platform, this latter edge being also bent upwardly. Secured to the brace 4 is a ring 5 for a tow line. Furthermore, a bent pipe or rod 6 is secured to the fore ends of the runners, said pipe or rod being adapted to form a handle for one or more men at the forcing of the sled into the mass of snow and the removal of the same therefrom by exerting a pull on the handle. At the front end of the sled, the bottom of the platform is bent upwardly, the same following the curvature of the runners, whereas at the rear end of the sled the platform is plane so as to permit of being readily pressed into the mass of snow.

At the rear end of the sled, a long knife 7 is pivotally mounted on each side of the sled on the side portions 3 of the platform. The knives are provided with a handle 8 and are shown in Fig. 1 with full drawn lines in their upwardly swung position and with chain-dotted lines in their downwardly swung position. In their swung-down position, the knives rest on knife supports 9 secured at the front to the sides of the platform. 10 designates a rear door adapted to be removably applied to the rear end of the sled, said door being shown in detail in Fig. 3. This door consists, for example, of sheet-iron with angle irons 11 secured to the sides thereof, said angle irons having a hook 12 rotatably secured thereto and arranged upon the mounting of the door in the ears 13 to engage corresponding notches 14 in the sides of the platform, as indicated in the drawing.

At the forcing of the sled into a mass of snow, the rear door 10 is removed, the knives 7 then taking their swung-down position along the sides of the sled. On account of the construction of the platform and the runners the resistance to the forcing of the sled into the mass of snow will be comparatively small. After the sled has been pressed into the mass of snow by one or more men acting on the handle 6, the two knives 7 are swung upwardly, the snow mass then loaded onto the sled being cut free along the sides of the sled from the surrounding snow, whereupon the knives may be swung down again. At the rear end of the sled, the snow may be cut off vertically by means of plane and thin snow spades. However, as such snow spades are generally too weak to permit of being used as levers to facilitate the starting of the sled under load, it is preferred for this purpose to employ coarser levers about of the shape shown in Figs. 4 and 5. By thrusting such levers into the snow to a sufficient depth and by prying in the longitudinal direction of the sled, the starting of the load of snow may be facilitated, whereupon one or more men may each apply a snow spade, for example, to the rear surface of the load and aid in transport by pressing the load forwardly, while others pull in the iron pipe 6 and in lines, which is all done to facilitate the starting and the transport.

The removable rear door 10 should then be applied onto the rear head of the sled, for instance to prevent the load of snow from sliding rearwardly off the sled, should the road of transport have one or more uphill gradients.

After the load of snow has been carried away and is to be unloaded, the rear door 10 will have to be removed, whereupon the sled may sometimes be jerked away and the charge of snow remain in place, when desired, or, the sled with the charge of snow may be backed to a slope, where the sled may be stopped, for instance by means of a line wound about a post, on the sled having been backed down the slope, the snow being thus caused to slide off the sled.

The sled illustrated in the drawing is intended to be operated by manual power when being pressed into the mass of snow and at the transport of the charge, but obviously the invention is not limited to sleds for manual handling, but also comprises all constructions with thills or pulling and pressing means, for which horses or mechanically driven vehicles may be brought into use.

Obviously, the various details of the sled may also be modified or arranged otherwise than illustrated in the drawing, without departing from the principle of the invention.

Having now particularly described the nature of my invention and the manner of its operation what I claim is:

Sled for snow loading and transport, comprising two longitudinal runners, a snow loading platform mounted immediately on top of said runners and having bent up side portions and a flat loading surface adapted to be driven directly into a mass of snow, on each side of the platform and pivotally connected to the bent up side portion of the same a knife adapted to rest along said side portion during transport and to be swung upwards vertically in the longitudinal direction of the sled to cut the loaded snow loose from the surrounding mass of snow, a removable rear door, and means for attaching said rear door to the platform during transport.

KNUT OSKAR HOLMSTRÖM.